US009935896B2

(12) United States Patent
Chang et al.

(10) Patent No.: US 9,935,896 B2
(45) Date of Patent: Apr. 3, 2018

(54) SYSTEM AND METHOD FOR SCALING MULTICLOUDS IN A HYBRID CLOUD ARCHITECTURE

(71) Applicant: Cisco Technology, Inc., San Jose, CA (US)

(72) Inventors: David W. Chang, Milpitas, CA (US); Abhijit Patra, Saratoga, CA (US); Nagaraj A. Bagepalli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 14/743,714

(22) Filed: Jun. 18, 2015

(65) Prior Publication Data

US 2016/0373378 A1 Dec. 22, 2016

(51) Int. Cl.
*G06F 15/16* (2006.01)
*H04L 12/947* (2013.01)
(Continued)

(52) U.S. Cl.
CPC .......... *H04L 49/25* (2013.01); *H04L 12/1886* (2013.01); *H04L 12/4633* (2013.01);
(Continued)

(58) Field of Classification Search
CPC ..... H04L 47/10; H04L 47/20; H04L 47/2475; H04L 47/32; H04L 47/50; H04L 47/56; H04L 47/6275; H04L 47/746; H04L 47/822; H04L 41/509; H04L 43/08; H04L 41/12; H04L 43/10; H04L 67/10; H04L 41/0813; H04L 41/0823; H04L 45/66; H04L 63/08; G06F 2009/4557;
(Continued)

(56) References Cited

U.S. PATENT DOCUMENTS

| 8,856,339 | B2 | 10/2014 | Mestery et al. |
| 2013/0066939 | A1* | 3/2013 | Shao ............... H04L 67/1025 709/201 |
| 2013/0268643 | A1 | 10/2013 | Chang et al. |
| 2013/0283364 | A1 | 10/2013 | Chang et al. |
| 2014/0059226 | A1* | 2/2014 | Messerli ............ G06F 9/546 709/226 |

(Continued)

OTHER PUBLICATIONS

Cisco: "Cisco Hybrid Cloud Solution . . . "; http://www.cisco.com/c/en/us/products/collageral/cloud-systems-management/intercloud-fabric/whitepaper-c11-734799.pdf; May 29, 2015.

(Continued)

*Primary Examiner* — Djenane Bayard
(74) *Attorney, Agent, or Firm* — P. Su

(57) ABSTRACT

According to one aspect, a method includes an Intercloud Fabric Switch (ICS) included in a public cloud and an ICS cluster obtaining a packet, and determining if the packet is obtained from a site-to-site link that links the ICS to an enterprise datacenter. If the packet is obtained from the site-to-site link, it is determined whether the packet is an unknown unicast packet. If the packet is an unknown unicast packet, the packet is dropped, and if not, the packet is provided to an access link that links the ICS to a virtual machine. If the packet is not obtained from the site-to-site link, it is determined whether the packet is obtained from an inter-ICS link that allows the ICS to communicate with the ICS cluster. If the packet is obtained from the inter-ICS link, the packet is dropped if it is an unknown unicast packet.

12 Claims, 7 Drawing Sheets

(51) Int. Cl.

| | |
|---|---|
| *H04L 12/18* | (2006.01) |
| *H04L 12/46* | (2006.01) |
| *H04L 12/715* | (2013.01) |
| *H04L 29/08* | (2006.01) |
| *H04L 12/705* | (2013.01) |
| *H04L 12/24* | (2006.01) |
| *H04L 12/721* | (2013.01) |

(52) U.S. Cl.
CPC .......... *H04L 12/4641* (2013.01); *H04L 45/04* (2013.01); *H04L 67/1097* (2013.01); *H04L 41/042* (2013.01); *H04L 45/18* (2013.01); *H04L 45/66* (2013.01)

(58) Field of Classification Search
CPC ....... G06F 2009/45595; G06F 9/45558; G06F 17/30233; G06F 2209/503
See application file for complete search history.

(56) References Cited

U.S. PATENT DOCUMENTS

| | | | |
|---|---|---|---|
| 2014/0075183 A1* | 3/2014 | Wang | G06F 19/22 713/150 |
| 2014/0098813 A1 | 4/2014 | Mishra et al. | |
| 2014/0244851 A1* | 8/2014 | Lee | H04L 12/4641 709/228 |
| 2015/0253963 A1* | 9/2015 | Koohestanian | G06F 3/0486 715/745 |
| 2016/0248669 A1* | 8/2016 | Natarajan | H04L 47/125 |

OTHER PUBLICATIONS

Anonymous: "Cisco Intercloud Fabric . . . "; http://blogs.cisco.com/cloud.cisco-intercloud-fabric-release-2-2-1-is-featu re-packed; Jun. 12, 2015.

* cited by examiner

SYSTEM AND METHOD FOR SCALING MULTICLOUDS IN A HYBRID CLOUD ARCHITECTURE

TECHNICAL FIELD

The disclosure relates generally to communications networks. More particularly, the disclosure relates to utilizing hybrid clouds in an environment that includes multiple public clouds.

BACKGROUND

As the use of cloud-based platforms continues to evolve, cloud architectures are becoming more complex. For example, many cloud-based platforms include hybrid clouds. An Intercloud Fabric (ICF), such as an ICF available commercially from Cisco Systems, Inc., of San Jose, Calif., is an enterprise-centric hybrid cloud solution which extends enterprise infrastructures of customers to public clouds in order to fulfill hybrid cloud use cases such as workload migration, cloud bursting, and disaster recovery. An ICF generally allows an enterprise to effectively recreate its data center within a public cloud.

Multiclouds adds additional public clouds to architectures which use hybrid clouds. That is, multiclouds adds more clouds to the mix than a conventional hybrid cloud, which typically pairs a private cloud and a public cloud. A multicloud architecture may include clouds supported by two or more public infrastructures such as a service (IaaS) provider, a platform as a service (PaaS) provider, and a software as a service (SaaS) provider. The ability to scale multiclouds in a hybrid cloud architecture is critical to allow for the efficient implementation of a multicloud architecture.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
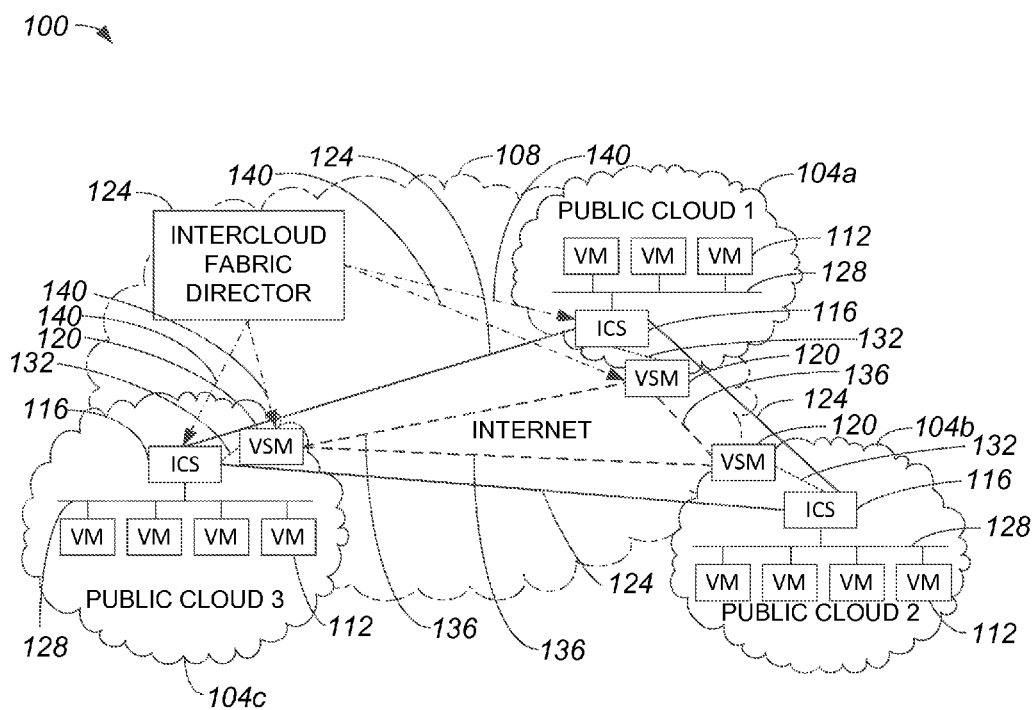
FIG. 1 is a diagrammatic representation of a hybrid cloud architecture in accordance with an embodiment.

In one embodiment, a method includes obtaining a packet on a first Intercloud Fabric Switch (ICS) that is part of an Intercloud Fabric (ICF) and included in a first public cloud, the first ICS being part of an cluster which includes a plurality of ICSes. A determination is made as to whether the packet is obtained from a site-to-site link, wherein the site-to-site link allows the first ICS to communicate with an enterprise datacenter. If it is determined that the packet is obtained from the site-to-site link, the method includes determining whether the packet is an unknown unicast packet. If it is determined that the packet is the unknown unicast packet, the packet is dropped. Alternatively, if it is determined that the packet is not the unknown unicast packet, the packet is provided to at least one access link that is arranged to allow the first ICS to communicate with at least one virtual machine. If the determination is that the packet is not obtained from the site-to-site link, the method includes determining whether the packet is obtained from an inter-ICS link arranged to allow the first ICS to communicate with the ICS cluster. Finally, if it is determined that the packet is obtained from the inter-ICS link, the method includes determining whether the packet is the unknown unicast packet and dropping the packet if it is determined that the packet is the unknown unicast packet.

DESCRIPTION

A hybrid cloud architecture allows an enterprise, e.g., a private user or customer, utilize enterprise resources as well as resources available on a public cloud. As will be appreciated by those skilled in the art, a hybrid cloud is generally a paired private cloud and public cloud. A private cloud is typically a cloud infrastructure operated by an enterprise for use by the enterprise, while a public cloud is typically a cloud infrastructure that provides services and resources over a network for public use.

A multicloud is generally an aggregation of hybrid clouds. A multicloud involves the use of multiple cloud computing services in a substantially single architecture, e.g., a single hybrid cloud architecture. In one example embodiment of a multicloud, and enterprise private cloud may be extended to two different public clouds. In another example embodiment, enterprise customers may create a hybrid cloud architecture which includes two or more public clouds.

An Intercloud Fabric (ICF), as for example an ICF available from Cisco Systems, Inc., of San Jose, Calif., is an enterprise-centric hybrid cloud solution which extends enterprise infrastructures of users to public clouds to support use cases including, but not limited to including, workload migration, cloud bursting, and/or disaster recovery. In one embodiment, an ICF architecture or an ICF hybrid cloud architecture is extended to cover hybrid cloud use cases in an environment which includes multiple public clouds. Intercloud Fabric Switches (ICSes) may be deployed in different publics clouds may be interconnected as a full-meshed network topology.

The use of a multi-cloud strategy provides the ability to allow an enterprise to migrate workloads from an enterprise data center to one or more public clouds or a service-provider clouds, and to use the cloud native services offered by one or more cloud providers. As such, providing a substantially seamless routing interface in an ICS for connecting cloud services allows services of multiple clouds and, hence, cloud providers, to be utilized in an efficient manner.

Referring initially to FIG. 1, a hybrid cloud architecture will be described in accordance with an embodiment. A hybrid cloud architecture includes an overall network 100 that essentially contains multiple public clouds 104a-c which communicate over the Internet 108. The use of multiple public clouds 104a-c to support enterprise customers allows the customers to migrate workloads to a given public cloud 104a-c and to utilize cloud native services offered by each cloud provider associated with public clouds 104a-c.

Each public cloud 104a-c includes any number of virtual machines (VMs) 112, at least one ICS 116, and a virtual supervisor module (VSM) 120. VSM 120 is generally arranged to manage ICSs, e.g., ICS 116, deployed at a public cloud 104a-c. For example, public cloud 104a includes three VMs 112, one ICS 116, and one VSM 120.

ICSes 116 of public clouds 104a-c communicate with each other through inter-ICS links 124 associated with Internet 108. In other words, ICSes 116 deployed in different public clouds 104a-c may be substantially interconnected as a full-meshed network topology with site-to-site tunnel connections or inter-ICS links 124. Inter-ICS links 124 are control connections between pairs of ICSes 124 that effectively enable endpoint Media Access Control (MAC) addresses learned at each ICS 124 to be distributed substantially while forwarding of unknown unicast network traffic may be avoided. As will be appreciated by those skilled in the art, unknown unicast network traffic is generally unicast traffic that is unable to find its destination. For example, an unknown unicast packet may be an L2 packet which is unable to find a matched entry in a MAC address table. Reducing the amount of unknown unicast traffic that is forwarded through network 100 allows for a more efficient usage of Wide Area Network (WAN) bandwidth.

VSMs 120 or, more generally, switch supervisors, are each associated with at least one ICS 116 and effectively ensure that switch functionality is available with respect to each public cloud 104a. That is, VSMs 120 form a supervisor cluster to ensure switch configuration persistency across public clouds 104a-c. When switch configuration persistency is maintained across VSMs 120, relatively sophisticated hybrid cloud use cases such as disaster recovery may be supported across public clouds 104a-c and/or private clouds.

In one embodiment, a hybrid cloud specific addressing domain may be used to overlay networks created in substantially all datacenters associated with public clouds 104a-c and private clouds (not shown) included in network 100. Such a specific addressing domain may allow an ICF to be deployed in public clouds 104a-c substantially without directed connectivity with enterprise networks, e.g., private clouds.

VSMs 120 of public clouds 104a-c communicate with each other through VSM-VSM control sessions 136. Within each public cloud 104a-c, VMs 112 communicate with each other, and with associated ICSes 116, through an ICF overlay network 128. In addition, within each public cloud 104a-c, ICS 116 communicates with VSM 120 through an ICS-VSM control session 132.

An intercloud fabric director 124 engages in management plane sessions 140 with at least some, but typically substantially all, ICSes 116 and VSMs 120 within network 100. Intercloud fabric director 124 effectively acts as a hybrid cloud manager, and may have a TLS-based management sessions to connect to substantially all ICSes 116 and VSMs 120. In one embodiment, intercloud fabric director 124 may be an enterprise hybrid cloud management platform that runs at an enterprise, although it should be appreciated that intercloud fabric director 124 may instead run on a public cloud. Intercloud fabric director 124 provides a customer, e.g., a customer enterprise, with the ability to manage workloads by accessing ICSes 116. That is, intercloud fabric director 124 effectively manages workload through different components using many Application Programming Interfaces (APIs), and communicates with ICSes 16 for managing workload network attachment.

Figure 2:
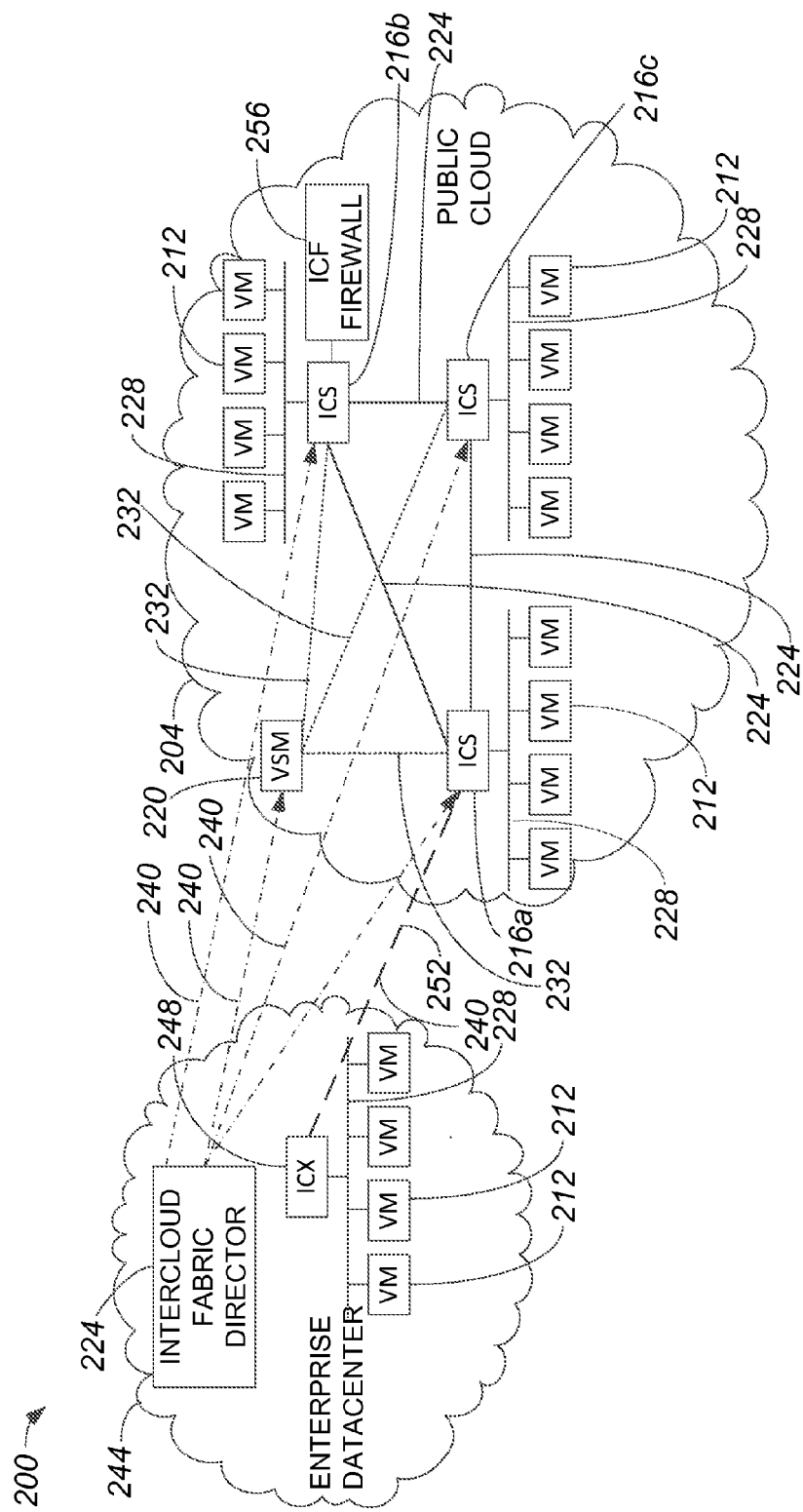
FIG. 2 is a diagrammatic representation of a network in which an Intercloud Fabric (ICF) capacity is scaled with interconnecting Intercloud Fabric Switches (ICSes) clusters in accordance with an embodiment.

ICF capacity may be scaled by interconnecting multiple ICS instances together to form an ICF cluster within a cloud and/or across multiple clouds. FIG. 2 is a diagrammatic representation of an architecture in which multiple ICSes are interconnected within a public cloud with additional inter-ICS links in accordance with an embodiment. An architecture 200 includes an enterprise datacenter 244 and at least one public cloud 204.

Enterprise datacenter 244, or a private cloud, includes an intercloud fabric director 224, an ICF extender (ICX) 248 and a plurality of VMs 212. VMs 212 are in communication with ICX 248 through an ICF overlay network 228. In one embodiment, ICS 248 provides a secure Layer 2 extension from enterprise data center 244 to public cloud 204, e.g., to ICS 216a of public cloud 204 through site-to-site link 252.

Public cloud 204 includes a plurality of ICSes 216a-c which are each in communication with VMs 212 through ICF overlay networks 228. ICF capacity is effectively scaled, as ICSes 216a-c are interconnected to form an ICS cluster.

As shown, public cloud 204 includes an ICF firewall 256, deployed on ICS 216b, which may be shared with substantially all VMs 212 in public cloud 204 across inter-ICS links 224 and ICF overlay networks 228, as for example ICF overlay networks 228 included in public cloud 204. Typically, ICF firewall 256 provides a firewall service that may be shared with VMs 212 in public cloud 204 substantially without a need for utilizing an enterprise network backbone.

A VSM 220, which is included in public cloud 204, is in communication with ICSes 216a-c through an ICS-VSM control session 232. Intercloud fabric director 224 communicates with VSM 220, as well as ICSes 216a-c, through a management plane session 240.

Figure 3:
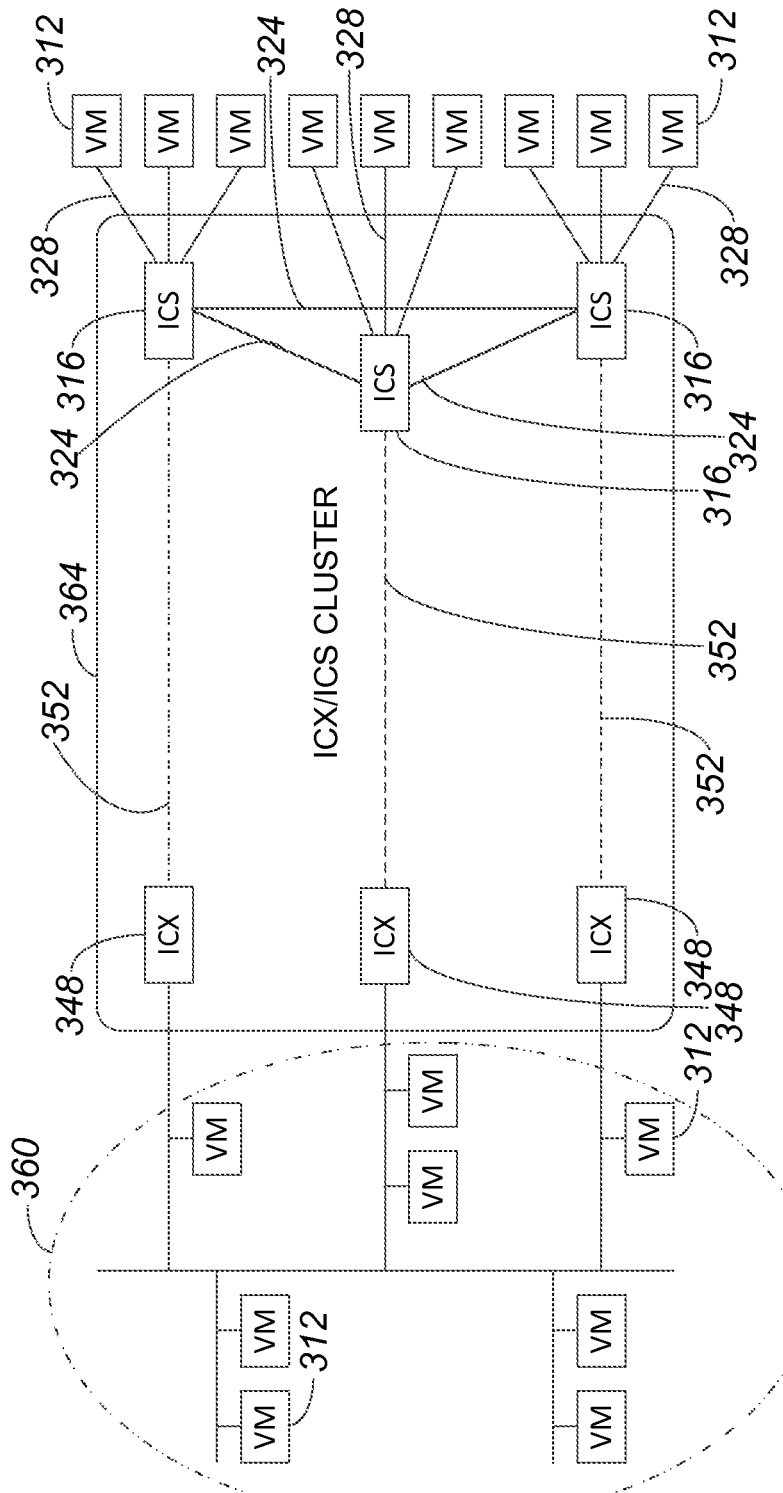
FIG. 3 is a diagrammatic representation of a system which is suitable for preventing broadcasting loops in multiple ICF links in accordance with an embodiment.

When ICF capacity is scaled with the use of an ICS cluster, as for example an ICS cluster that includes ICSes 216a-c, broadcast loops may occur due to the existence of multiple ICF links associated with ICF overlay networks such as ICF overlay networks 228. As such, forwarding rules may be implemented. With reference to FIG. 3, a system which is suitable for preventing broadcasting loops in multiple ICF links through the implementation of ICS forwarding rules will be described in accordance with an embodiment. An ICX/ICS cluster 364 includes a plurality of ICXes 348 and a plurality of ICSes 316. It should be appreciated that the number of ICXes 348 and ICSes 316 included in ICX/ICS cluster 364 may vary widely. In the embodiment as shown, each ICX 348 communicates with an associated ICS 316 on a site-to-site link 352.

Enterprise networks 360, which include VMs 312, may send or otherwise provide packets to ICXes 348 that are a part of ICX/ICS cluster 364, and may receive or otherwise obtain packets from ICXes 348. VMs 312 that are a part of public cloud may send packets to, and receive packets from, appropriate ICSes 316 of ICX/ICS cluster 364 through access links 328. ICSes 316 may send packets to and receive packets from each other using inter-ICS links 324. In one embodiment, ICXes 348 may be associated with different enterprise networks, while ICSes 316 may be associated with different public clouds. That is, ICX/ICS cluster 364 may include ICXes 348 from more than one enterprise network and ICSes 316 from more than one public cloud. It should be appreciated that while a site-to-site link typically connects and ICS and ICX pair, and that a broadcasting loop prevention algorithm is typically targeted on this deployment. However, in some embodiments, a site-to-site link may not necessarily connect an ICS and ICX pair.

Forwarding rules may be implemented to prevent broadcasting loops. When unicast and/or broadcast packets are obtained by an ICS 316 from site-to-site links 352, such packets may be forwarded to access links 328 and not to any other links. Further, unicast and/or broadcast packets received by ICSes 326 from inter-ICS links 324 may also be forwarded to access links 328 and not to any other links. It should be appreciated that rather than forwarding all unknown unicast packets, ICSes 316 may drop some unknown unicast packets, such as those obtained from site-to-site links 352 and from inter-ICS links 324.

In one embodiment, forwarding rules may be such that substantially all unicast and/or broadcast packets received or otherwise obtained from access links 328 may be forwarded to other links, e.g., by ICSes 312 on site-to-site links 352. Unknown unicast packets received by ICSes 312 from access links 328 are generally forwarded to site-to-site links 352.

Figure 4:
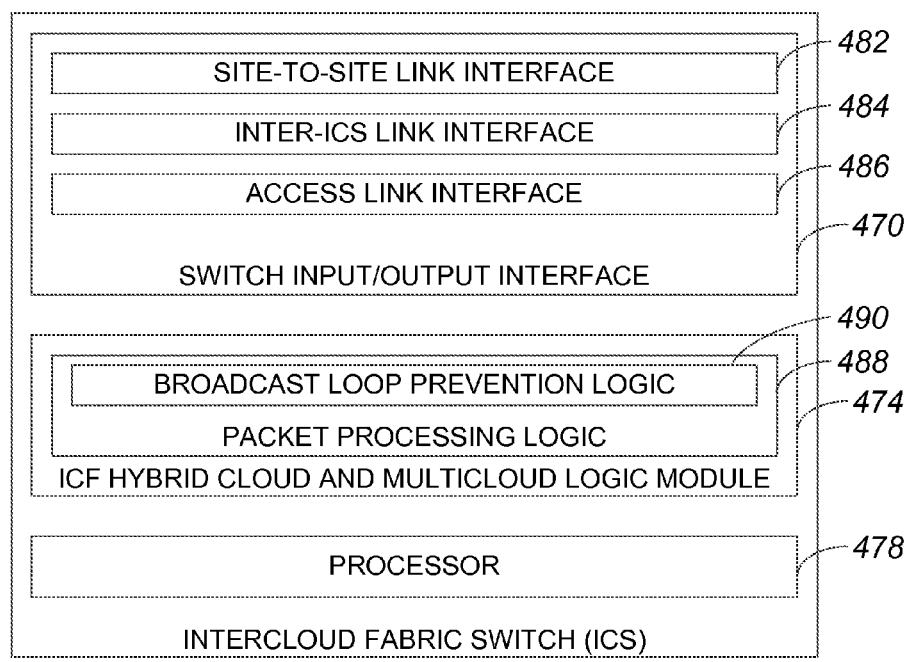
FIG. 4 is a diagrammatic representation of an ICS in accordance with an embodiment.

Referring next to FIG. 4, an ICS will be described in accordance with an embodiment. An ICS 416, which may be included in any suitable public cloud, includes at least one switch input/output (I/O) interface 470, an ICF hybrid cloud and multicloud logic module 474, and a processor 478. It should be appreciated that switch I/O interface 470 generally includes at least one switch port.

Switch I/O interface 470 is generally configured to allow ICS 416 to communicate with components located within the same public cloud as ICS 416, as well as with other ICSes and with an enterprise datacenter or private cloud. Typically, switch I/O interface 470 may support wireless and/or wired communications. Packets are obtained from a network through switch I/O interface 470, and provided to the network through switch I/O interface 470.

Switch I/O interface 470 may generally include a site-to-site link interface 482, an inter-ICS link interface 484, and an access link interface 486. Site-to-site link interface 482 is arranged to allow ICS 416 to communicate with an ICX, for example, using a site-to-site link. Inter-ICS link interface 484 is arranged to allow ICS 416 to communicate with other ICSes, e.g., other ICSes that are included in the same ICS cluster as ICS 416, over inter-ICS links. Access link interface 486 is arranged to allow ICS 416 to communicate with VMs over access links or over an ICF overlay network.

ICF hybrid cloud and multicloud logic module 474, which may include hardware and/or software logic, is generally configured to allow ICS 416 to operate within an ICF hybrid cloud architecture that support multiple public clouds. Processor 478 executes software logic included in ICF hybrid cloud and multicloud logic module 474. ICF hybrid cloud and multicloud logic module 474 includes packet processing logic 488. Packet processing logic 488 includes broadcast loop prevention logic 490 which implements forwarding rules that serve to prevent broadcasting loops from occurring when multiple links exist within the ICF hybrid cloud architecture.

Figure 5A:
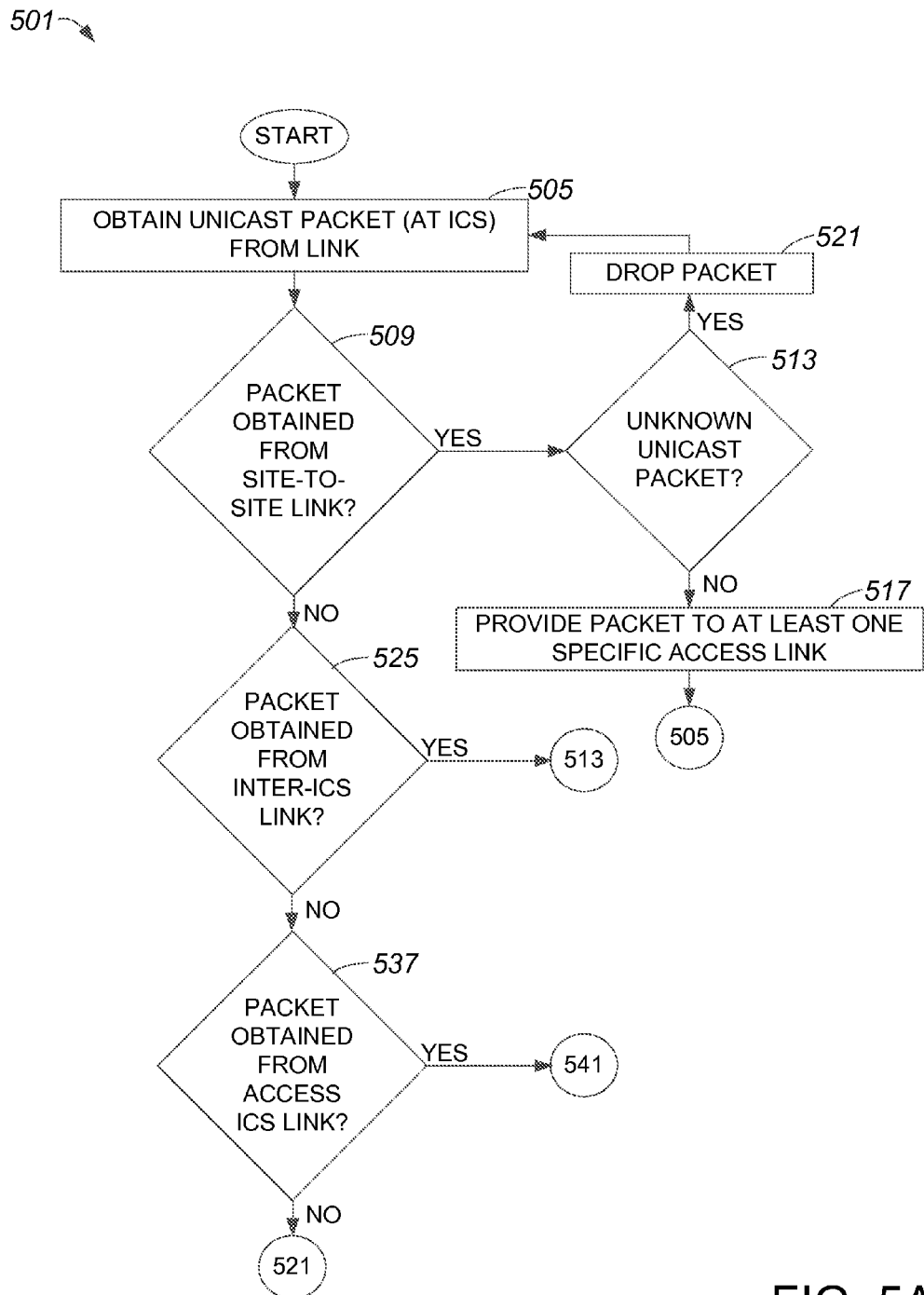
FIGS. 5A and 5B are a process flow diagram which illustrates a method of preventing broadcasting loops when a unicast packet is received in accordance with an embodiment.
Figure 5B:
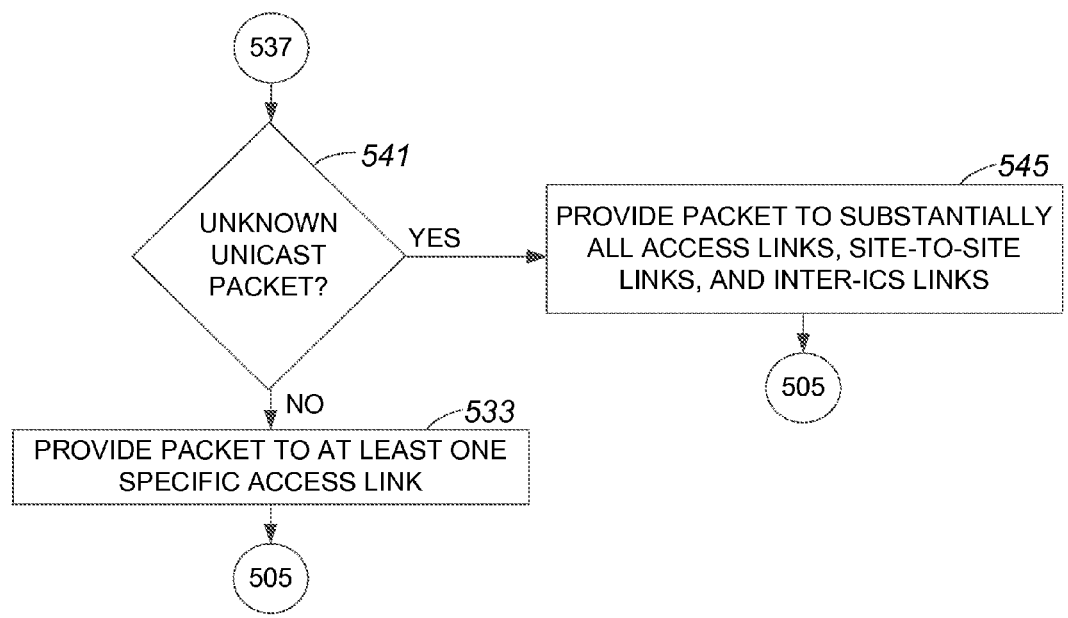

FIGS. 5A and 5B are a process flow diagram which illustrates a method of preventing broadcasting loops associated with unicast packets from occurring when multiple links exist within an ICF hybrid cloud architecture in accordance with an embodiment. A method 501 of preventing broadcasting loops begins at step 505 in which a unicast packet, which is associated with unicast network traffic, is obtained at an ICS on a link that is one of any number of links. Typically, the ICS may be included in a public cloud and/or may be part of an ICX/ICS cluster such as ICX/ICS cluster 364 of FIG. 3.

After the unicast packet is obtained, it is determined whether the packet is obtained from, or received from, a site-to-site link in step 509. If the determination in step 509 is that the packet is obtained from a site-to-site link, then a determination is made in step 513 as to whether the packet obtained is an unknown unicast packet.

If the packet is determined not to be an unknown unicast packet, the indication is that the packet is a known unicast packet. As such, the packet is provided to, or forwarded to, at least one specific access link associated with the ICS in step 517. Once the packet is provided to, or forwarded to, the specific access link, process flow returns to step 505 in which another unicast packet is obtained. Alternatively, if the packet is determined to be an unknown unicast packet, the packet is dropped in step 521. After the packet is dropped, another packet is obtained by the ICS.

Returning to step 509 and the determination of whether the packet is obtained from a site-to-site link, if the determination is that the packet is not obtained from a site-to-site link, then a determination is made in step 525 as to whether the packet is obtained on an inter-ICS link. If the determination is that the packet is obtained on an inter-ICS link, then process flow moves to step 513 in which it is determined whether the packet is an unknown unicast packet.

Alternatively, if the determination in step 525 is that the packet is not obtained on an inter-ICS link, a determination is made in step 537 as to whether the packet is obtained from an access ICS link. If it is determined that the packet was not obtained from an access ICS link, then the packet is dropped in step 521. If it is determined that the packet was obtained from an access ICS link, process flow moves from step 537 to step 541 in which a determination is made as to whether the packet is an unknown unicast packet. If the determination is that the packet is an unknown unicast packet, the packet is provided to substantially all access links, site-to-site links, and inter-ICS links in step 545. Once the packet is provided to substantially all access links, site-to-site links, and inter-ICS links, process flow returns to step 505 in which another packet is obtained at the ICS.

Alternatively, if the packet is determined not to be an unknown unicast packet in step 541, the packet is provided to at least one specific access link in step 533. After the packet is provided to the specific access link, process flow returns to step 505 in which another packet is obtained.

Figure 6:
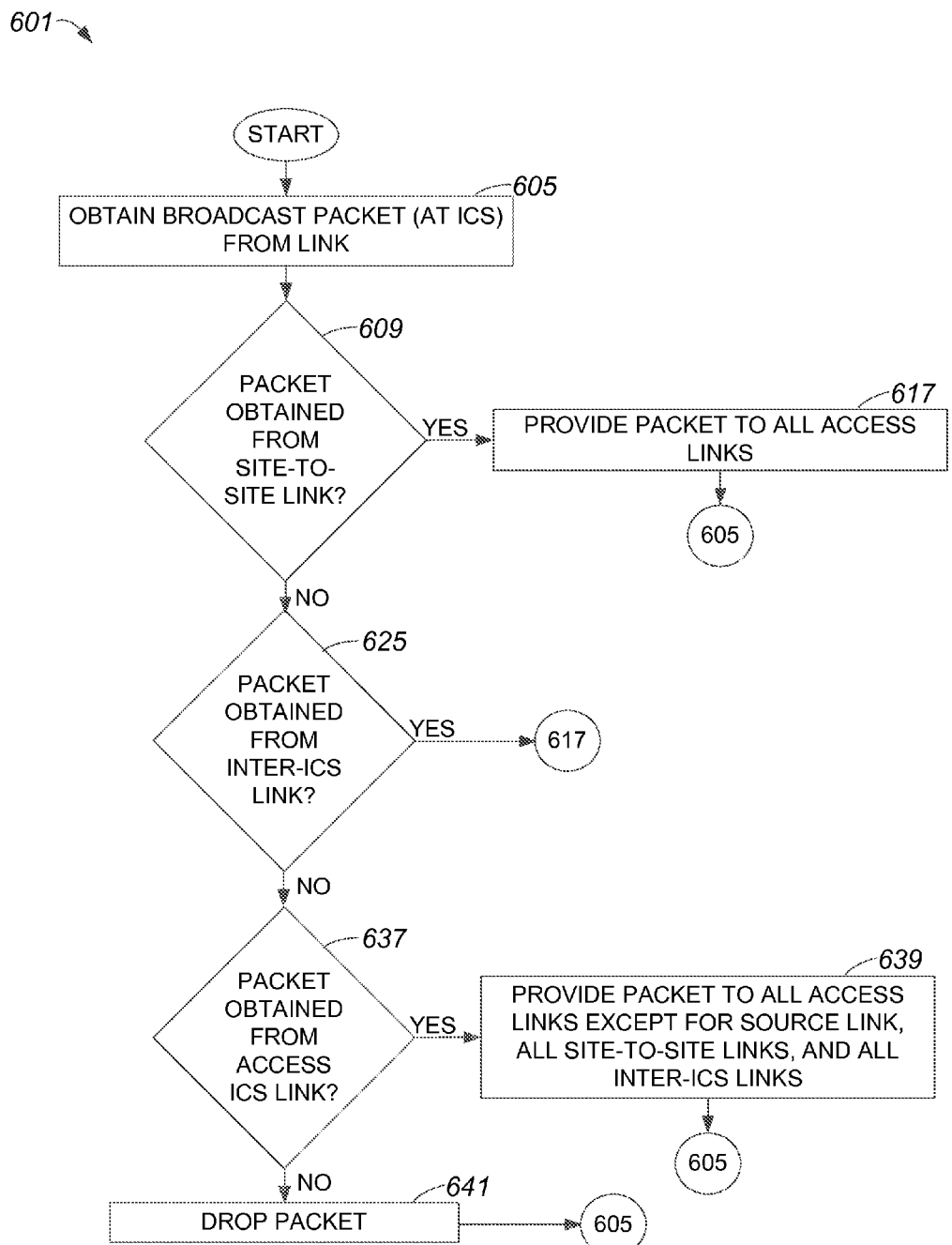
FIG. 6 is a process flow diagram which illustrates a method of preventing broadcasting loops when a broadcast packet is received in accordance with an embodiment.

FIG. 6 is a process flow diagram which illustrates a method of preventing broadcasting loops associated with broadcast packets from occurring when multiple links exist within an ICF hybrid cloud architecture in accordance with an embodiment. A method 601 of preventing broadcasting loops begins at step 605 in which a broadcast packet, which is associated with broadcast network traffic, is obtained from a link at an ICS. The link may be any of a plurality of links. Typically, the ICS may be included in a public cloud and/or may be part of an ICX/ICS cluster such as ICX/ICS cluster 364 of FIG. 3.

After the broadcast packet is obtained, it is determined whether the packet is obtained from, or received from, a site-to-site link in step 609. If the determination in step 609 is that the packet is obtained from a site-to-site link, then the packet is provided to substantially all access links in step 617. Once the packet is provided to substantially all access links, process flow returns to step 605 in which another broadcast packet is obtained from a link.

Returning to step 609 and the determination of whether the packet is obtained from a site-to-site link, if the determination is that the packet is not obtained from a site-to-site link, then a determination is made in step 625 as to whether the packet is obtained on an inter-ICS link. If the determination is that the packet is obtained on an inter-ICS link, then process flow moves to step 617 in which the packet is provided to substantially all access links.

Alternatively, if the determination in step 625 is that the packet is not obtained on an inter-ICS link, a determination is made in step 637 as to whether the packet is obtained from an access ICS link. If it is determined that the packet was not obtained from an access ICS link, then the packet is dropped in step 641. If it is determined that the packet was obtained from an access ICS link, process flow moves from step 637 to step 639 in which the packet is provided to substantially all site-to-site links, substantially all inter-ICS links, and substantially all access links except for the source link. From step 639, process flow returns to step 605 in which another packet is obtained at the ICS.

A hybrid cloud architecture in accordance with the present disclosure is configured to span multiple private and/or public clouds, and supports the deployment to hybrid cloud use cases onto the architecture. Logically centralized and physically distributed switch control module, e.g., VSMs, provide substantially real time switch control functionality, and allow ICSes deployed on public clouds to effectively work independently. As a result, relatively complex hybrid cloud use cases such as disaster recovery use cases may be supported. In one embodiment, a flexible architecture allows an enterprise to interconnect multiple ICSes across clouds and within a cloud, and broadcast loop prevention functionality prevents broadcasting loops from arising with respect to packet transmission.

Although only a few embodiments have been described in this disclosure, it should be understood that the disclosure may be embodied in many other specific forms without departing from the spirit or the scope of the present disclosure. By way of example, while an ICF has generally been described as creating a hybrid cloud by extending enterprise data centers or private clouds into public clouds, it should be appreciated that in lieu of or in addition to extending enterprise data centers into public clouds, enterprise data centers may also be extended to provider-hosted clouds.

Hybrid cloud use cases have generally been described in terms of a private cloud and at least one public cloud. It should be appreciated, however, that use hybrid cloud uses cases may also cover use cases which involve different public clouds without departing from the spirit or the scope of the present disclosure.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, structures, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining a packet on a first Intercloud Fabric Switch (ICS) that is part of an Intercloud Fabric (ICF), the first ICS being part of an cluster which includes a plurality of ICSes, wherein the first ICS is included in a first public cloud;
    determining whether the packet is obtained from a site-to-site link, wherein the site-to-site link allows the first ICS to communicate with an enterprise datacenter;
    if it is determined that the packet is obtained from the site-to-site link, determining whether the packet is an unknown unicast packet;
    if it is determined that the packet is the unknown unicast packet, dropping the packet;
    if it is determined that the packet is not the unknown unicast packet, providing the packet to at least one access link, the at least one access link being arranged to allow the first ICS to communicate with at least one virtual machine;
    if it is determined that the packet is not obtained from the site-to-site link, determining whether the packet is obtained from an inter-ICS link, wherein the inter-ICS link is arranged to allow the first ICS to communicate with the ICS cluster; and
    if it is determined that the packet is obtained from the inter-ICS link, determining whether the packet is the unknown unicast packet and dropping the packet if it is determined that the packet is the unknown unicast packet.

2. The method of claim 1 wherein if it is determined that the packet is not obtained from the inter-ICS link, the method further includes determining if the packet is obtained from the at least one access link.

3. The method of claim 2 wherein if it is determined that the packet is obtained from the at least one access link, the method further includes:
    providing the packet on the site-to-site link, on the inter-ICS link, and on the at least one access link if the packet is the unknown unicast packet; and
    providing the packet to the at least one access link if the packet is not the unknown unicast packet.

4. The method of claim 1 wherein if it is determined that the packet is obtained from the inter-ICS link and if it is determined that the packet is not the unknown unicast packet, the method further includes providing the packet to the at least one access link.

5. The method of claim 1 wherein the enterprise datacenter includes an ICF extender (ICX), the ICX being included in the cluster.

6. The method of claim 1 wherein the plurality of ICSes includes a second ICS included in a second public cloud, and wherein the inter-ICS link is arranged to allow the first ICS to communicate with the second ICS.

7. One or more tangible non-transitory, computer-readable media comprising instructions stored thereon that, when executed on a processor, are operable to:
   obtain a packet on a first Intercloud Fabric Switch (ICS) that is part of an Intercloud Fabric (ICF), the first ICS being part of an cluster which includes a plurality of ICSes, wherein the first ICS is included in a first public cloud;
   determine whether the packet is obtained from a site-to-site link, wherein the site-to-site link allows the first ICS to communicate with an enterprise datacenter;
   determine whether the packet is an unknown unicast packet if it is determined that the packet is obtained from the site-to-site link;
   drop the packet if it is determined that the packet is the unknown unicast packet;
   provide the packet to at least one access link if it is determined that the packet is not the unknown unicast packet, the at least one access link being arranged to allow the first ICS to communicate with at least one virtual machine;
   determine whether the packet is obtained from an inter-ICS link if it is determined that the packet is not obtained from the site-to-site link, wherein the inter-ICS link is arranged to allow the first ICS to communicate with the ICS cluster;
   determine whether the packet is the unknown unicast packet if it is determined that the packet is obtained from the inter-ICS link; and
   drop the packet if it is determined that the packet is the unknown unicast packet obtained from the inter-ICS link.

8. The one or more tangible, non-transitory, computer-readable media of claim 7 wherein if it is determined that the packet is not obtained from the inter-ICS link, the one or more tangible, non-transitory, computer-readable media further includes instructions operable to determine if the packet is obtained from the at least one access link.

9. The one or more tangible, non-transitory, computer-readable media of claim 8 wherein if it is determined that the packet is obtained from the at least one access link, the instructions are further operable to:
   provide the packet on the site-to-site link, on the inter-ICS link, and on the at least one access link if the packet is the unknown unicast packet; and
   provide the packet to the at least one access link if the packet is not the unknown unicast packet.

10. The one or more tangible, non-transitory, computer-readable media of claim 7 wherein if it is determined that the packet is obtained from the inter-ICS link and if it is determined that the packet is not the unknown unicast packet, the instructions are further operable to provide the packet to the at least one access link.

11. The one or more tangible, non-transitory, computer-readable media of claim 7 wherein the enterprise datacenter includes an ICF extender (ICX), the ICX being included in the cluster.

12. The one or more tangible, non-transitory, computer-readable media of claim 7 wherein the plurality of ICSes includes a second ICS included in a second public cloud, and wherein the inter-ICS link is arranged to allow the first ICS to communicate with the second ICS.

* * * * *